United States Patent
Yamada

(10) Patent No.: US 7,899,589 B2
(45) Date of Patent: Mar. 1, 2011

(54) CONTROL INFORMATION STORAGE APPARATUS AND PROGRAM FOR SAME

(75) Inventor: Kazunao Yamada, Anjo (JP)

(73) Assignee: Denso Corporation, Kariya (JP)

( * ) Notice: Subject to any disclaimer, the term of this patent is extended or adjusted under 35 U.S.C. 154(b) by 847 days.

(21) Appl. No.: 11/808,946

(22) Filed: Jun. 14, 2007

(65) Prior Publication Data

US 2008/0004761 A1    Jan. 3, 2008

(30) Foreign Application Priority Data

Jun. 30, 2006    (JP)    .............................. 2006-181651

(51) Int. Cl.
    *G01C 22/00* (2006.01)
(52) U.S. Cl. ....................................................... 701/25
(58) Field of Classification Search .................. 701/200, 701/207–208, 212–214; 340/988, 990, 995
    See application file for complete search history.

(56) References Cited

U.S. PATENT DOCUMENTS

| | | | |
|---|---|---|---|
| 4,891,761 | A | 1/1990 | Gray et al. |
| 5,948,042 | A | 9/1999 | Heimann et al. |
| 6,047,234 | A * | 4/2000 | Cherveny et al. ........... 701/200 |
| 6,360,162 | B1 | 3/2002 | Meis et al. |
| 6,381,533 | B1 | 4/2002 | Crane et al. |
| 6,516,267 | B1 | 2/2003 | Cherveny et al. |
| 6,577,334 | B1 | 6/2003 | Kawai et al. |
| 6,674,434 | B1 | 1/2004 | Chojnacki et al. |
| 2003/0125871 | A1 | 7/2003 | Cherveny et al. |
| 2005/0149259 | A1 | 7/2005 | Cherveny et al. |

FOREIGN PATENT DOCUMENTS

| | | |
|---|---|---|
| DE | 199 16 967 | 11/2000 |
| DE | 102 58 470 | 7/2004 |
| JP | A-11-328592 | 11/1999 |
| JP | A-2001-134896 | 5/2001 |
| JP | A-2001-141467 | 5/2001 |
| JP | A-2004-086363 | 3/2004 |
| JP | A-2005-091071 | 4/2005 |
| JP | A-2005-121707 | 5/2005 |

OTHER PUBLICATIONS

Office Action dated Oct. 12, 2009 from the German Patent and Trademark Office for corresponding application No. 10 2007 029 359.5-54 (English translation enclosed).

* cited by examiner

*Primary Examiner*—Kim T Nguyen
(74) *Attorney, Agent, or Firm*—Posz Law Group, PLC

(57) ABSTRACT

A navigation apparatus stores control information used for controlling a vehicle in a portion of a road between two intersections (i.e., an exit from an intersection) in a form that is associated with each of plural links in road data. For example, a stop line at an entrance to an intersection is detected as a control end point, and a point at an exit from an intersection is detected as a control start point. In addition, a travel locus of the vehicle is stored as control information associated with the control start point and the control end point based on an absolute position of the vehicle. The control information is output to a vehicle control unit when the vehicle travels the road with the control information available for use by the control unit. In this manner, the control unit of the navigation apparatus precisely controls the vehicle based on a shape of the road in a real world.

20 Claims, 14 Drawing Sheets

FIG. 8

| LINK | TRAVEL DIRECTION | TYPE | START PT | 1 | 2 | 3 | 4 | 5 | 6 | END PT |
|---|---|---|---|---|---|---|---|---|---|---|
| L1 | ↑ | SHAPE | (a,b) | (i,j) | (k,l) | (m,n) | (o,p) | (q,r) | (u,v) | (s,t) |
| | | INCLINATION | a | b | c | d | e | f | g | h |
| | | SPEED | 45 | 50 | 55 | 60 | 40 | 30 | 10 | 30 |
| | | ACC | | +5 | +5 | +5 | −20 | −10 | −20 | +20 |
| | | ○○ | ○ | ○ | ○ | △ | △ | ○ | ○ | ○ |
| | ↓ | SHAPE | (a,b) | (i,j) | (k,l) | (m,n) | (o,p) | (q,r) | (u,v) | (s,t) |
| | | INCLINATION | a | b | c | d | e | f | g | h |
| | | △△ | ○ | ○ | △ | △ | ○ | ○ | ○ | ○ |
| L2 | ↑ | SHAPE | (e,f) | (k,l) | (m,n) | (o,p) | (q,r) | (u,v) | (e,f) | (k,l) |
| | ↓ | SHAPE | (g,h) | (e,f) | (k,l) | (k,l) | (m,n) | (o,p) | (q,r) | (u,v) |

CONTROL INFORMATION STORAGE APPARATUS AND PROGRAM FOR SAME

CROSS REFERENCE TO RELATED APPLICATION

This application is based on and claims the benefit of priority of Japanese Patent Application No. 2006-181651 filed on Jun. 30, 2006, the disclosure of which is incorporated herein by reference.

Field of the Invention

The present invention generally relates to a driving support apparatus for use in a vehicle.

BACKGROUND INFORMATION

In recent years, various techniques for controlling a vehicle in accordance with map data that is used in a navigation system is proposed. The map data must have a sufficient accuracy for controlling the vehicle in an appropriate manner. However, currently available map data does not have the sufficient accuracy for a required control.

A couple of the techniques for controlling the vehicle use a trace of a travel of the vehicle stored for controlling the vehicle. The trace of the travel of the vehicle is stored as control information for controlling the vehicle.

For example, Japanese patent document JP-A-2005-91071 discloses a road information study system that improves an accuracy of averaged data when the system compiles road information database for controlling the vehicle based on a collection of data being picked up a sensor on the vehicle. In this system, the road information is detected while the vehicle travel a road, and the road information database is stored in associated with positional information in road map information. Then, the average and standard deviation of the road information database are used to calculate road information selection criteria that ranges around the averaged data. Then, the road information in the range of the selection criteria is adopted as an update information of the road information database. In this manner, the variation of the road information is removed beforehand so as to improve the accuracy of the average of the road information database.

Further, Japanese patent document JP-A-2001-141467 discloses a database modification system that modifies road database having a predetermined set of registered roads. The database modification system in the above disclosure identifies a road that is traveled by the vehicle based on a current position and a node data, and modifies the database based on a travel route data for representing the identified road and travel trace data for representing a trace of a travel of the vehicle. Then, the travel route is divided into plural portions for determining that at least one of a start and an end of the trace of the travel of the vehicle in the divided portion of the travel route is in a straight portion. When none of the start and the end of the trace of the travel of the vehicle is in the straight portion, at least one of the start and the end of the trace is changed.

Furthermore, Japanese patent document JP-A-2005-121707 discloses a road information modification apparatus that matches a road shape of stored road information with a real road shape including information on a drive lane of the road. The road information modification apparatus modifies the stored road information based on a travel trace information of the vehicle that actually traveled a road. The road information modification apparatus modifies the road information on respective drive lanes based on the travel trace information when the stored road information is capable of representing the road shape as an integrated road of bi-directional traffic.

However, the apparatus and the system in the above disclosures only consider a control of the vehicle according to a real shape of the road based on a trace of a travel of the vehicle. That is, in other words, a timing of the vehicle control is not considered in terms of a required accuracy of the control.

SUMMARY OF THE INVENTION

In view of the above and other problems, the present invention provides a control information storage apparatus and a program for storing the control information that provides an improved accuracy of vehicle control.

The control information storage apparatus of the present disclosure includes a position detector that detects a current position of a vehicle, an information storage that stores a travel locus of the vehicle based on the current position of the vehicle as control information to be utilized for controlling the vehicle at an exit from an intersection, and a control point detection unit that detects an exit point from the intersection as a control start point for starting a control of the vehicle. The information storage stores the control start point detected by the control point detection unit as the control information. In this case, the intersection generally means a point of connection of plural roads such as a cross shape road, a T shape road, a branching point, a merging point and the like.

The control information storage apparatus of the present disclosure stores, as the control information for the purpose of controlling the vehicle, the control start point for starting the vehicle control as well as the travel locus of the vehicle. The control information stored in the apparatus facilitates the vehicle control that accommodates the road shape of an actual road derived from the travel locus of the vehicle, and further identifies a control start timing of the vehicle control with an improved accuracy based on the control start point included in the control information.

Further, the control information storage apparatus is realized by using a computer program that controls a computer to be serving as above-described unit of the apparatus, thereby achieving the same effect. Furthermore, the computer program can be downloaded through a network, and/or can be replaced with each relative to actual hardware components, thereby facilitating an improvement of its function.

BRIEF DESCRIPTION OF THE DRAWINGS

Other objects, features and advantages of the present invention will become more apparent from the following detailed description made with reference to the accompanying drawings, in which:

FIG. 8 shows a table of control information stored in a memory;

DETAILED DESCRIPTION

Embodiments of the present disclosure are described with reference to the accompanying drawings. The embodiments in the following describes the situation in the left-hand traffic system. However, the present disclosure can be applied to the right-hand traffic system if the right and left relationship is reversed.

[Configuration]

Figure 1:
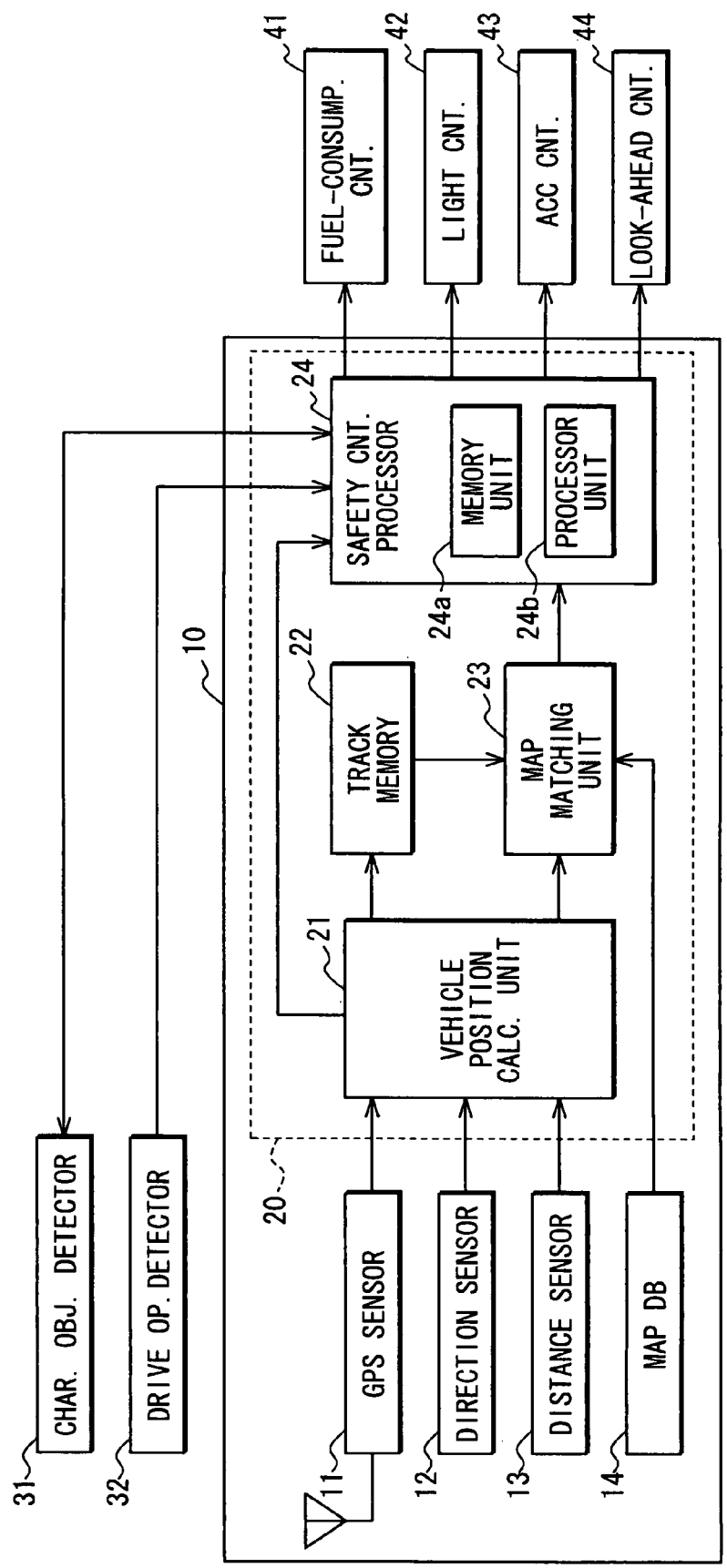
FIG. 1 shows a block diagram of a navigation apparatus in an embodiment of the present disclosure.

FIG. 1 shows a block diagram of a navigation apparatus 10 in an embodiment of the present disclosure. The navigation apparatus 10 includes a Global Positioning System (GPS) sensor 11, a direction sensor 12, a distance sensor 13, a map database 14, and a control unit 20.

The GPS sensor 11 is capable of detecting an absolute position of the vehicle that has the navigation apparatus 10 by receiving a radio wave from satellites with GPS antenna. The absolute position of the vehicle includes the latitude and the longitude of the vehicle.

The direction sensor 12 is capable of detecting an absolute direction of the vehicle based on the geomagnetism.

The distance sensor 13 is capable of detecting a travel distance of the vehicle.

Figure 2:
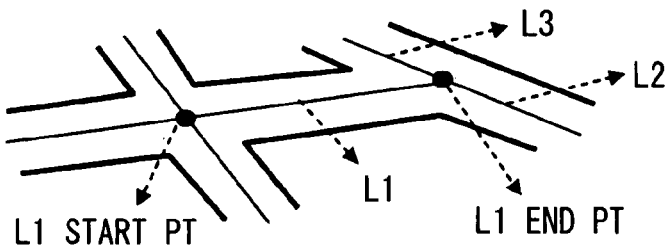
FIG. 2 shows an illustration of a road included in map data.

The map database 14 is capable of storing map data that includes various information regarding a map. The map data uses nodes and links for representing the road in the real world. The nodes are set to a center position of each of the intersections of the roads, and the links are set to connects those nodes. That is, as shown in FIG. 2, the roads stored in the map data are divided into a unit of the link for data management, and each of the links is connected to another link at its end point. Further, each of the links is associated with a link ID (a road identifier) for uniquely, identifying those links. The 'intersections' in the above context generally means a point of connection of plural roads, that is, a cross shape road, a T shape road, a branching point, a merging point, and the like. In other words, the node is defined as a connection point that connects at least three links in the map data.

In addition, the map database 14 may be configured to store the map data in a hard disk drive, and the map data may be retrieved from a magnetic disk, an optical magnetic disk, a portable memory medium such as a semiconductor memory or the like.

The control unit 20 is implemented as a microcomputer that includes a CPU, a ROM, a RAM, an Input/Output (I/O), and a bus line for connecting those components for performing various processes. For example, the control unit 20 performs a current position display process for displaying a current vehicle position mark on the map data in a display unit by retrieving a map from the map data stored in the map database 14, a route guidance process for providing an optimum route from the current position of the vehicle to a destination of a travel, and the like as well as detecting a current position of the vehicle (i.e., the absolute position of the vehicle) based on detection signals from the GPS sensor 11, the direction sensor 12, and the distance sensor 13. In this case, the ROM stores programs for performing the processes described later in the description. The processes are described with reference to FIGS. 4-7 and FIG. 13.

Further, the control unit 20 has an input of information from a characteristic object detector 31 and a drive operation detector 32.

The characteristic object detector 31 is a detector for detecting a characteristic object that exists in an intersection. The characteristic object in this context means an object that characterizes an intersection when it is detected. In the present embodiment, a marker drawn on the road such as a stop line, a pedestrian crossing or the like is detected as the characteristic object. Further, the characteristic object detector 31 in the present embodiment is implemented as a back camera that is positioned to capture an image by looking downward (including a right downward direction) from a high position of a rear end of the vehicle.

The drive operation detector 32 is a detector for detecting information of driving operation performed by the driver. The driving operation information detected in the present embodiment includes a steering angle, a vehicle speed, and a vehicle acceleration.

The vehicle having the navigation apparatus 10 has plural vehicle control units 41-44 for controlling the vehicle. That is, a fuel-consumption controller 41, a light controller 42, an ACC controller 43, and a look-ahead controller 44 are included therein. The fuel-consumption controller 41 is capable of improving a fuel consumption by controlling a driving power based on a shape of the road ahead of the vehicle. The light controller 42 is capable of controlling a direction of the light axis based on a shape of the road ahead of the vehicle. The ACC controller 43 is capable of performing an Adaptive Cruise Control that maintains an appropriate distance from a leading vehicle by having a target acceleration controlled in accordance with a current distance from the leading vehicle, a relative speed, and a travel condition of the own vehicle. The ACC controller 43 controls an engine, a gear, a brake and the like of the own vehicle for maintaining the appropriate distance. The look-ahead controller 44 is capable of assisting a drive operation that accords with a condition of the road ahead of the vehicle.

Figure 3:
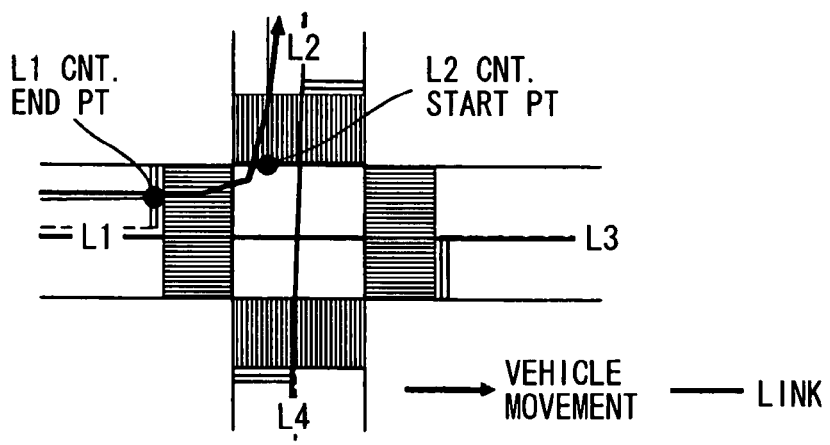
FIG. 3 shows an illustration of a featured point detection process at an intersection.

The navigation apparatus 10 in the present embodiment stores the control information for controlling the vehicle traveling in a portion of the road between two intersections in association with the links. More practically, the apparatus 10 detects the point where the vehicle exits from the intersection as a control start point, and also detects the point where the vehicle enters into another intersection as a control end point. In the present embodiment, as shown in FIG. 3, the apparatus 10 detects a stop line where the vehicle passes on entering into the intersection as the control end point, and detects the intersection where the vehicle exits from as the control start point. Then, a travel locus of the vehicle based on an absolute position of the vehicle (designated as an absolute travel locus hereinafter) having the control start point as a start point of the locus and the control end point as an end point of the locus is stored as the control information in a memory. The control information is output to the vehicle control units 41-44 when the vehicle travels on the road that is associated with already stored control information. In this manner, the vehicle control units 41-44 perform accurate vehicle controls based on an actual road shape. Particularly, the navigation apparatus 10 improves the accuracy of the vehicle control by outputting to the vehicle control units 41-44 a vehicle passing timing that defines a time of passage of the vehicle through the control start/end points.

[Description of Processes]

Processes performed in the control unit 20 are described in the following.

The control unit 20 functions as a vehicle position calculation unit 21, a track memory 22, a map matching unit 23 and a safety control processor 24 as shown in FIG. 1. In particular, the safety control processor 24 functions as a memory unit 24a and an information processor unit 24b. In addition, though each of these functions can be respectively realized by independent hardware, these functions are realized by using single piece of hardware in the present embodiment.

Figure 4:
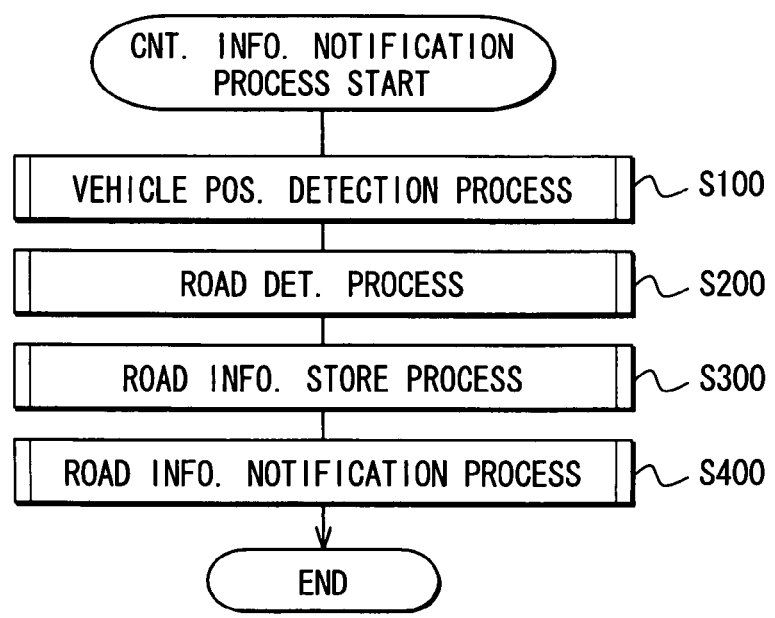
FIG. 4 shows a flowchart of a control information notification process.

The control unit 20 periodically carries out control information notification process shown in a flowchart in FIG. 4 periodically (at every interval time t (e.g., at every 100 ms)). That is, when a vehicle position detection process is started, a vehicle position detection process that is described later (in FIG. 5) in step S100. In step S200, the map matching unit 23 performs a road determination process that is described later (in FIG. 6). In step S300, the safety control processor 24 performs a road information store process that is described later (in FIG. 7). In step S400, the safety control processor 24 performs a road information notification process that is described later (in FIG. 13). Then, the control information notification process is concluded.

The processes performed in steps S100 thru S400 are now described in detail.

Figure 5:
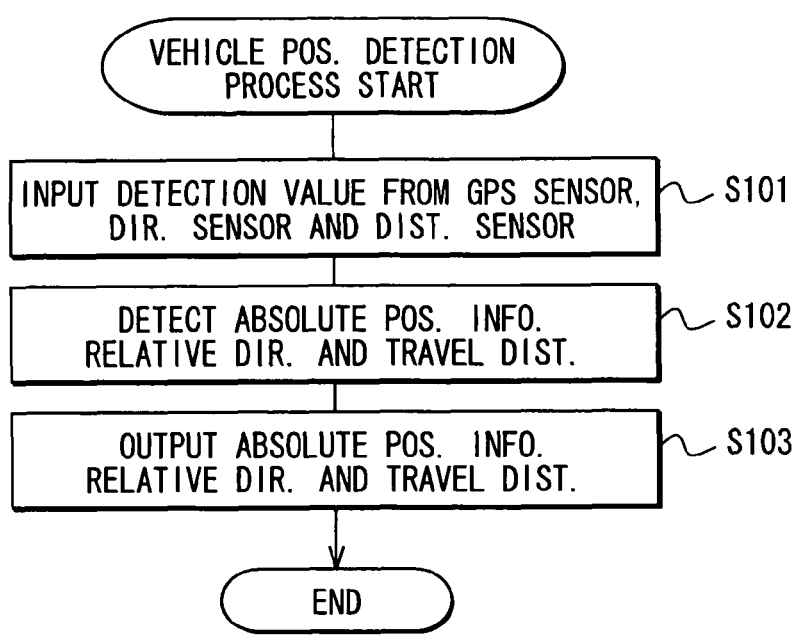
FIG. 5 shows a flowchart of a vehicle position detection process.

First, the vehicle position detection process in step S100 is described with reference to the flowchart in FIG. 5.

When the detection process is started, detection values from the GPS sensor 11, the direction sensor 12 and the distance sensor 13 are inputted in step S101.

Then, in step S102, an absolute position information that represents a current position (i.e., an absolute position) of the vehicle as well as a relative direction and a travel distance relative to a vehicle position of time t before now are detected based on the detection values inputted in step S101.

Then, in step S103, the relative direction and the travel distance is output to the track memory 22, and the absolute position information is output to each of the map matching unit 23 and the safety control processor 24. Then, the vehicle position detection process is concluded. In this case, the track memory 22 stores and accumulates the inputted relative direction and the travel distance from the vehicle position calculation unit 21 as travel locus data that represents a relative travel locus of the vehicle.

Figure 6:
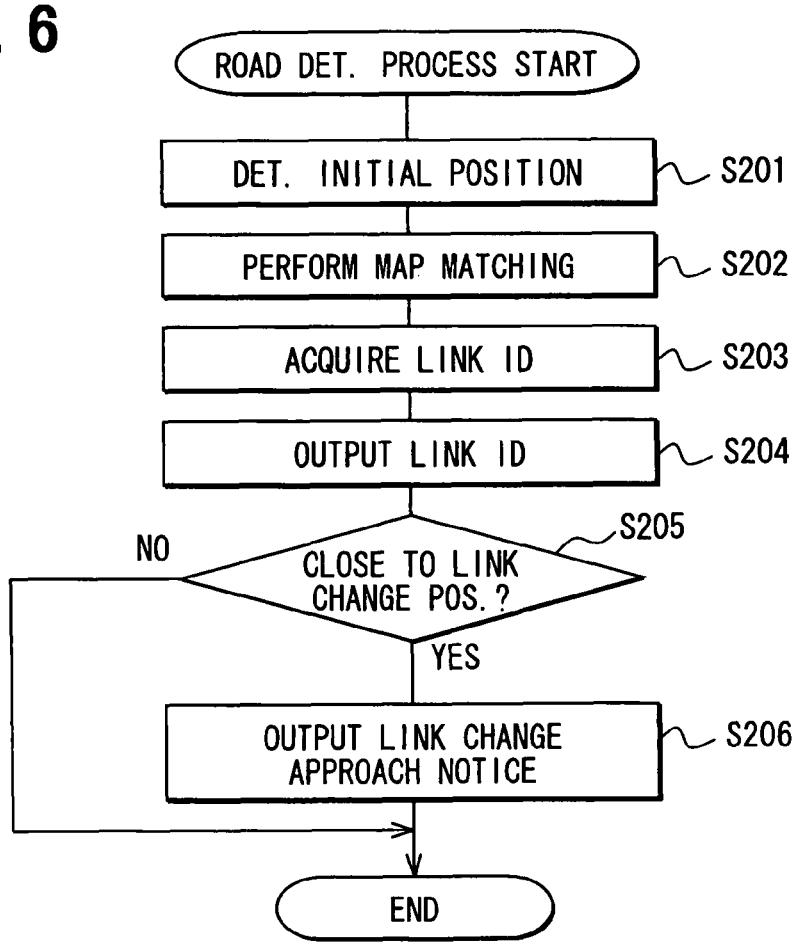
FIG. 6 shows a flowchart of a road determination process.

Next, the road determination process performed in step S200 by the map matching unit 23 is described with reference to the flowchart in FIG. 6. When the road determination process is started, an initial position of the vehicle is determined based on an input of the absolute position information from the vehicle position calculation unit 21 in step S201.

Then, in step S202, a map matching process is performed based on a map that is represented by map data stored in the map database 14. More practically, the relative travel locus stored in the track memory 22 and a road pattern in the map are compared with each other for determining the most correlated road pattern with the relative travel locus as the road being currently traveled (a pattern matching process), and the current vehicle position is corrected to agree with the road pattern.

Then, in step S203, the link ID of the link that corresponds to the currently traveled road is acquired from the map data.

Then, in step S204, the link ID acquired in step S203 is output to the safety control processor 24.

Then, in step S205, whether the vehicle is coming close to an intersection of a road that lies ahead of the vehicle is determined. More practically, whether the vehicle has passed a threshold point that is used as a closeness criterion to an end point of the link that corresponds to the currently traveled road is determined. The threshold point of the closeness criterion is, for example, determined as a point on a road 20 meters prior to the intersection. In this case, this determination process is used only for determining that the vehicle has come close to the intersection. Therefore, an accuracy of the determination may only be in a moderate level.

Then, the road determination process proceeds to step S206 when the vehicle is determined to be coming close to the intersection ahead of the vehicle (S205:YES), and a link change advance notice is output to the safety control processor 24. Then, the road determination process is concluded. The road determination process is, on the other hand, concluded without performing step S206 when the vehicle is not determined to be coming close to the intersection in a road ahead of the vehicle (S205:NO).

Figure 7:
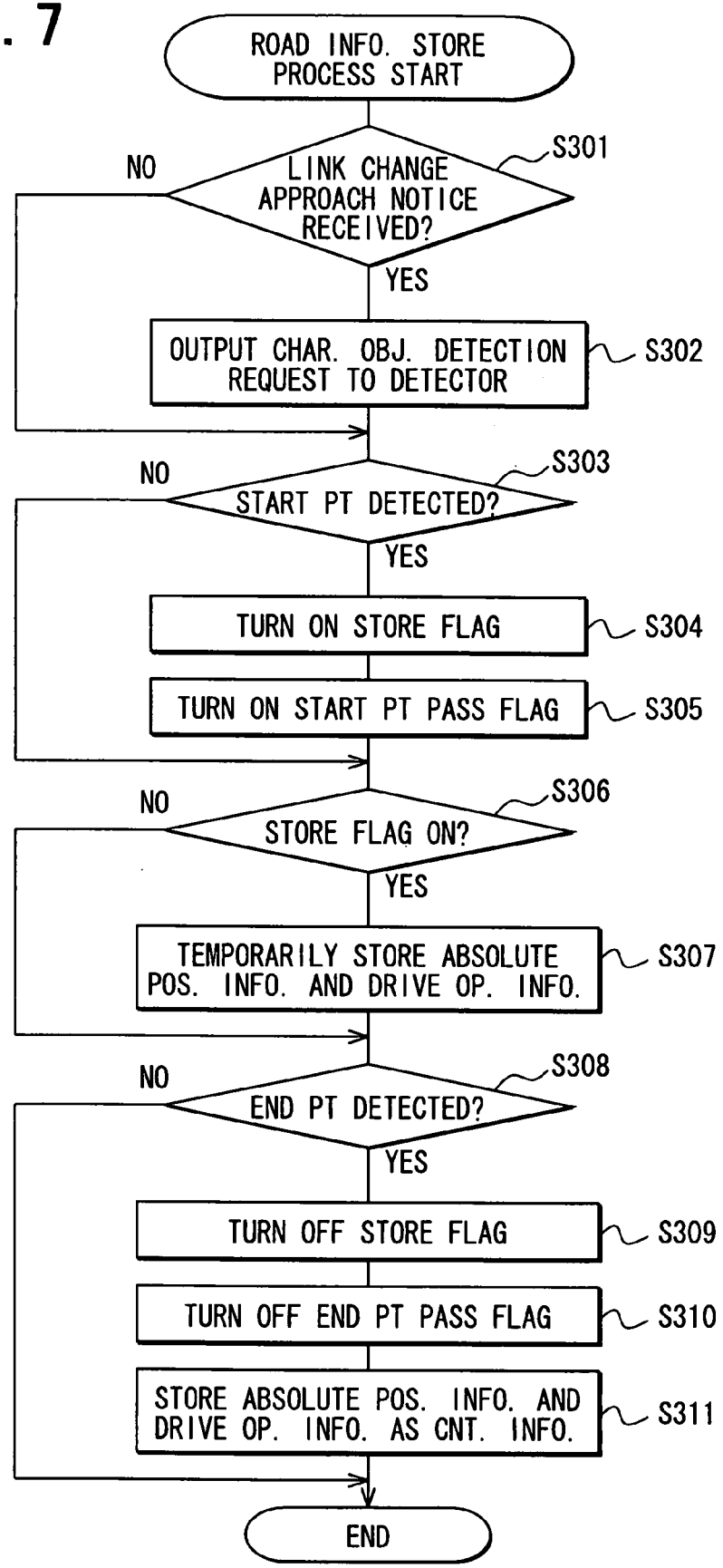
FIG. 7 shows a flowchart of a road information store process.

Next, the road information store process in step S300 by the safety control processor 24 is described with reference to the flowchart in FIG. 7.

When the road information store process is started, an input of the link change advance notice from the map matching unit 23 is determined in step S301.

Then, the process proceeds to step S302 when the link change advance notice is determined to be inputted in step S301 (S301:YES). In step S302, a characteristic object detection request is output to the characteristic object detector 31 before proceeding to step S303. That is, in the present embodiment, the characteristic object detector 31 starts a characteristic object detection process (i.e., an image capture and an image analysis) only when the characteristic object detection request is inputted from the control unit 20 of the navigation apparatus 10. In this manner, the detection process is performed by the detector 31 only when the vehicle is traveling close to an intersection. Then, the detector 31 outputs a characteristic object candidate notice to the control unit 20 of the navigation apparatus 10 when the characteristic object such as a stop line or a pedestrian crossing is detected. In other words, the detector 31 outputs the notice to the control unit 20 when the vehicle passes by the position of the characteristic object. Therefore, the characteristic object candidate notice is inputted at a timing when the vehicle passes by the position of the characteristic object. In this case, the characteristic object detector 31 may end the characteristic object detection process at a timing based on, for example, an elapsed time or a travel distance, or based on a position of the vehicle on the map.

When the link change advance notice is not determined to be inputted in step S301 (S301:NO), the process proceeds to step S303 without proceeding to step S302.

In step S303, whether the vehicle has exited from the intersection is determined. In other words, the detection of the control start point is determined. More practically, when plural points on the road at which the characteristic object candidate notice that indicates the detection of the pedestrian crossing are inputted from the characteristic object detector 31, the closest point where the link ID inputted from the map matching unit 23 is changed among the inputted points from the detector 31 is detected as the control start point. That is, the pedestrian crossing that is closest the point where the link corresponding to the traveling road is changed is detected as the control start point.

Then, when the control start point is detected in step S303 (S303:YES), the process proceeds to step S304, and a store flag that indicates a storage condition of the information such as the absolute travel locus is turned on.

Then, in step S305, a start point pass flag that indicates that the vehicle has passed the control start point is turned on before proceeding to step S306. In this case, the start point pass flag is turned off when the road information store process is started.

On the other hand, when the control start point is not determined to be detected in step S303 (S303:NO), the process proceeds to step S306 without proceeding to steps S304 and S305.

In step S306, the process determines whether the store flag is turned on. In this case, the store flag is turned on when the control start point is detected as described above, and it is turned off when the control end point is detected as described later in the description.

Then, when the store flag is determined to be turned on in step S306 (S306:YES), the process proceeds to step S307, and stores the absolute position information inputted from the vehicle position calculation unit 21 and the drive operation information inputted from the drive operation detector 32. Then, the process proceeds to step S308.

On the other hand, when the store flag is not determined to be turned on in step S306 (S306:NO), the process proceeds to step S308 without proceeding to step S307.

In step S308, the process determines whether the vehicle has entered into the intersection is determined. More practically, when plural points on the road at which the characteristic object candidate notice that indicates the detection of the stop line are inputted from the characteristic object detector 31, the closest point where the link ID inputted from the map matching unit 23 is changed among the inputted points from the detector 31 is detected as the control end point. That is, the stop line that is closest the point where the link corresponding to the traveling road is changed is detected as the control end point.

Then, when the control end point is determined to be detected in step S308 (S308:YES), the process proceeds to step S309, and the store flag is turned off.

Then, in step S310, an end point pass flag that indicates that the vehicle has passed the control end point is turned on. In this case, the end point pass flag is turned off when the road information store process is started.

Then, in step S311, the absolute position information and the drive operation information stored in step S307 is stored in the memory unit 24a as the control information, and the road information store process is concluded.

Figure 9:
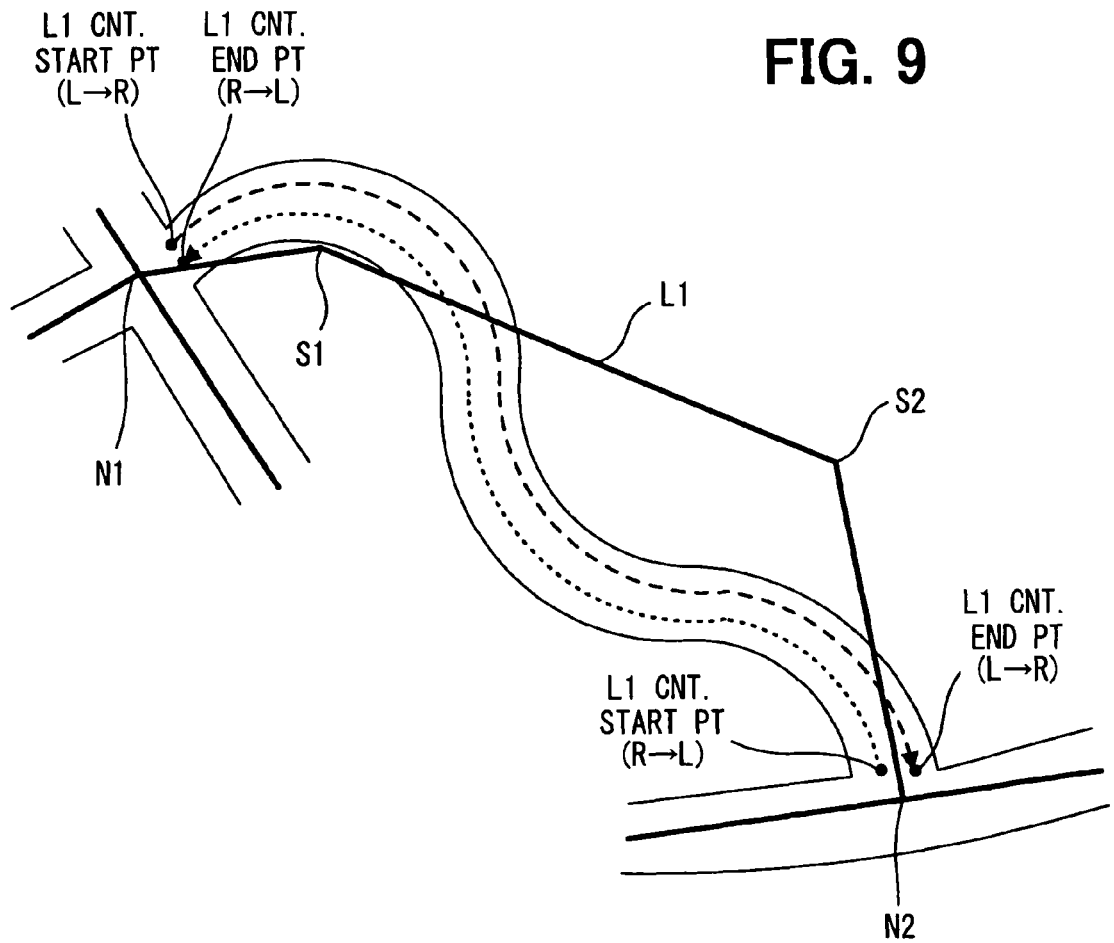
FIG. 9 shows an illustration of a travel locus in each of travel directions.

More practically, the control information is, as shown in FIG. 8, stored separately link by link, and in a manner that distinguishes each of the travel directions of the traffic (Two pieces of the control information are associated with a single link). That is, as shown in FIG. 9, even when the vehicle travels the road that corresponds to the same link L1, the travel locus of the vehicle that travels from right to left (a broken line) and the travel locus of the vehicle from left to right (a dotted line) are distinguished with each other because a lane to be traveled is different for each of those cases. Particularly, when the road is in a curved shape, the difference between the two loci is noticeable. Therefore, the single link is associated with plural pieces of the control information for respective travel directions. In this case, N1 and N2 are nodes on each end of the link L1, and S1 and S2 are shape points of the link L1 that defines the shape of the link L1.

Figure 10:
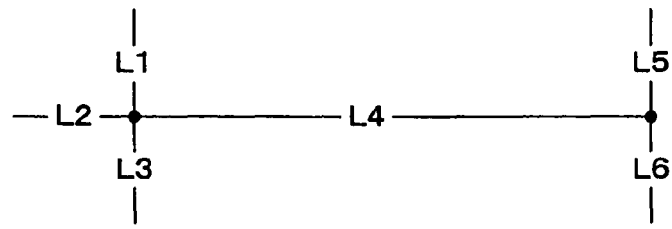
FIG. 10 shows an illustration of a travel direction determination method.

The method for determining the travel direction is now described. In the present embodiment, the travel direction of the vehicle in a link is determined based on the link being traveled before the vehicle enters the current link. More practically, as shown in FIG. 10, when the vehicle enters the link L4 from one of the links L1, L2, L3, the travel direction of the vehicle is determined as a left-to-right direction geometrically. On the other hand, when the vehicle enters the link L4 from one of the links L5, L6, the travel direction of the vehicle is determined as a right-to-left direction in the same manner. In this case, the method for determining the travel direction is not limited to the one described above. That is, the travel direction of the vehicle may also be determined based on, for example, the change of the current vehicle position or the azimuth direction of the vehicle.

For use as the control information, information such as a road shape (the latitude and the longitude), an road incline (a height of the road), a vehicle speed and acceleration, a steering angle and the like are stored. In this case, the road shape and the road incline are derived from the absolute position information, and the speed, the acceleration and the steering angle is derived from the drive operation information. Further, the control information is stored only for a section of the road that starts at the control start point and ends at the control end point.

In addition, when the control information having the same link ID and the same travel direction is already stored, the control information may be updated based on the comparison of the data accuracy, or the old and the new data may be averaged to have the updated information.

On the other hand, when the control end point is not determined to be detected in step S308 (S308:NO), the road information store process is concluded without proceeding to steps S309 to S311.

Figure 11:
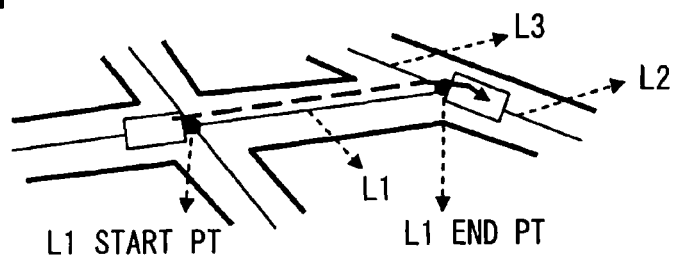
FIG. 11 shows an illustration of a process assisted by the road information store process.

A concrete example of the process realized by the road information store process is explained as a case that the vehicle travels from the link L1 to the link L2 as shown in FIG. 11.

Figure 12:
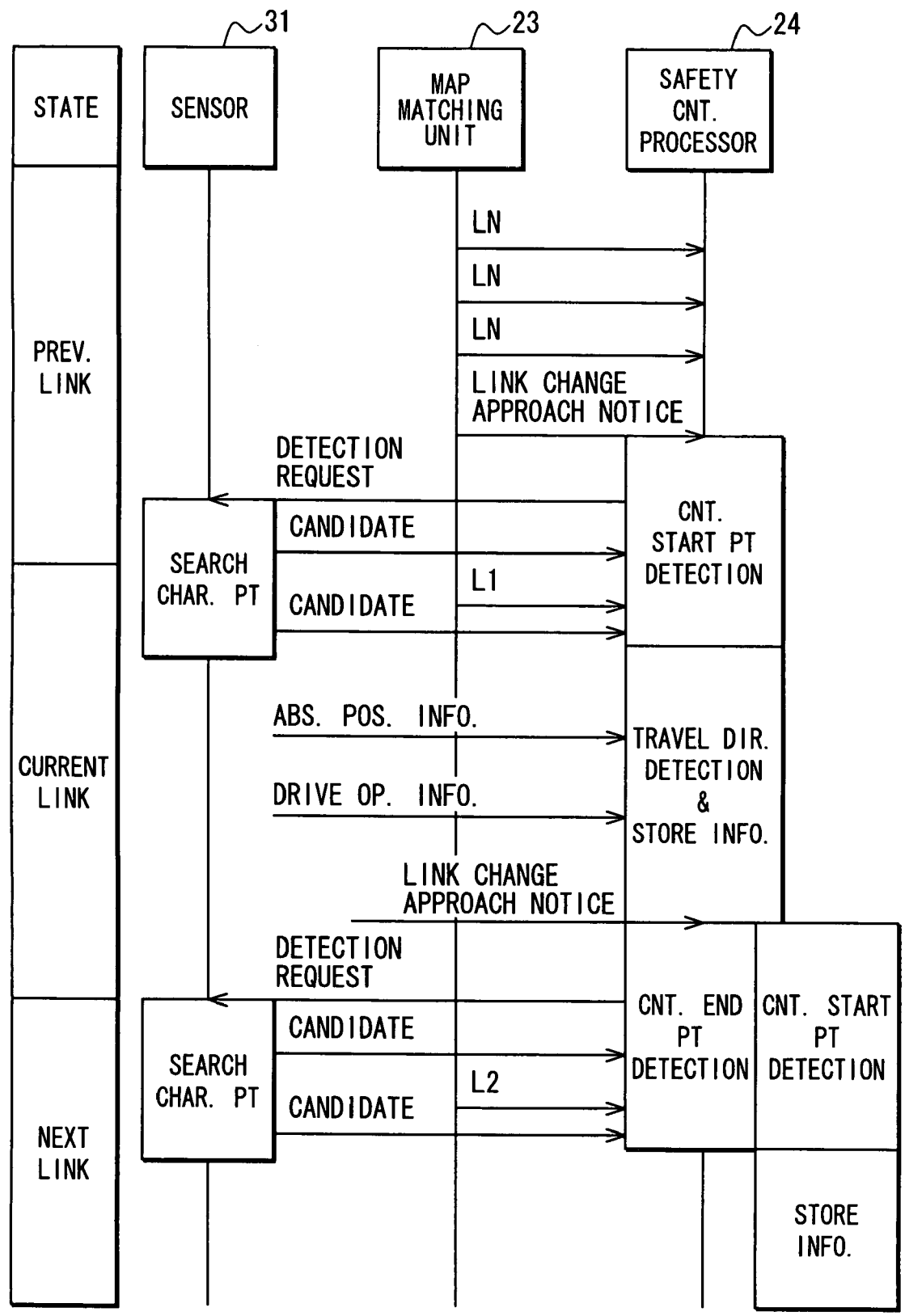
FIG. 12 shows a time chart of the road information store process.

As shown in FIG. 12, while the vehicle is traveling in the link LN that leads to the link L1, the link ID of the link LN is output from the map matching unit 23 to the safety control processor 24. Then, when the vehicle reaches a proximity of the intersection (i.e., the start point of the link L1), the link change advance notice is output from the map matching unit 23 to the safety control processor 24.

The safety control processor 24 outputs the characteristic object detection request to the characteristic object detector 31 when the link change advance notice is inputted from the map matching unit 23. In this manner, the characteristic object detector 31 starts the detection process of the characteristic object, and outputs the characteristic object candidate notice to the safety control processor 24 when the characteristic object (a stop line or a pedestrian crossing) is detected.

The safety control processor 24 determines, as the control start point of the link L1, the position of the characteristic object that corresponds to the characteristic object candidate notice (i.e., an intersection) inputted at a timing that is closest to the link change timing when the link ID is changed from the link LN to the link L1. Then, the absolute position information from the vehicle position calculation unit 21 and the drive operation information from the drive operation detector 32 are stored as the control information of the link L1.

Then, the link change advance notice is output from the map matching unit 23 to the safety control processor 24 when the vehicle reaches a proximity of the intersection (i.e., the end point of the link L1).

The safety control processor 24 outputs the characteristic object detection request to the characteristic object detector 31 when the link change advance notice is inputted from the map matching unit 23. In this manner, the detector 31 starts the detection process of the characteristic object, and the characteristic object candidate notice is output to the safety control processor 24 when the characteristic object is detected.

The safety control processor 24 determines, as the control end point of the link L1, the position of the featured point that corresponds to the characteristic object candidate notice (the stop line) inputted at the timing that is closest to the link change timing when the link ID is changed from the link L1 to the link L2 based on the link ID from the map matching unit 23 and the characteristic object candidate notice from the characteristic object detector 31.

The absolute travel locus and the drive operation information between the control start point and the control end point are stored as the control information of the link L1 based on the above described processes.

Figure 13:
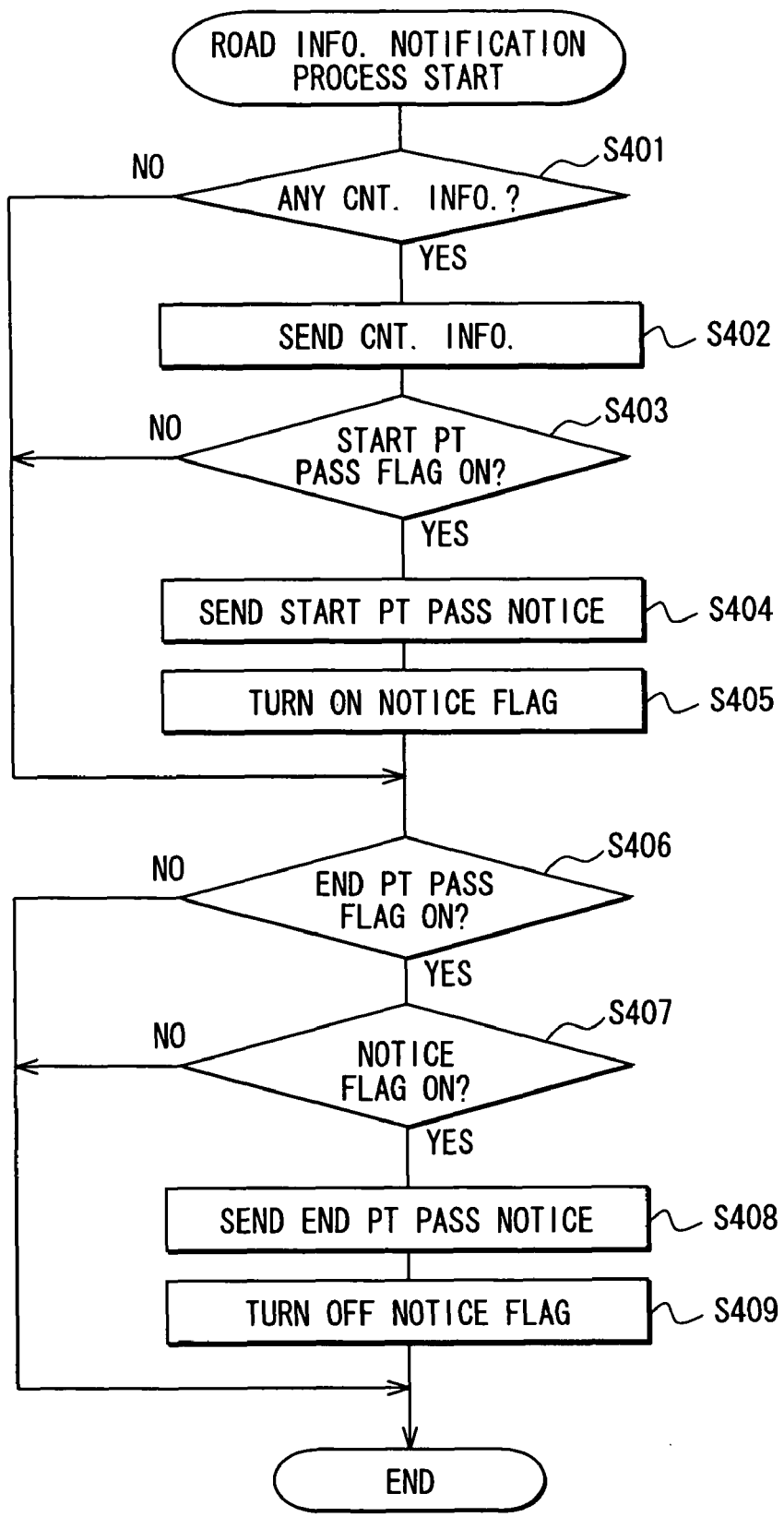
FIG. 13 shows a flowchart of a road information notification process.

Next, the road information notification process (S400) performed by the safety control processor 24 is described with reference to the flowchart in FIG. 13.

When the road information notification process is started, the process determines whether the control information corresponding to the currently traveled link having a suitable travel direction in terms of the current travel direction of the vehicle is stored in the memory unit 24a is determined.

Figure 14:
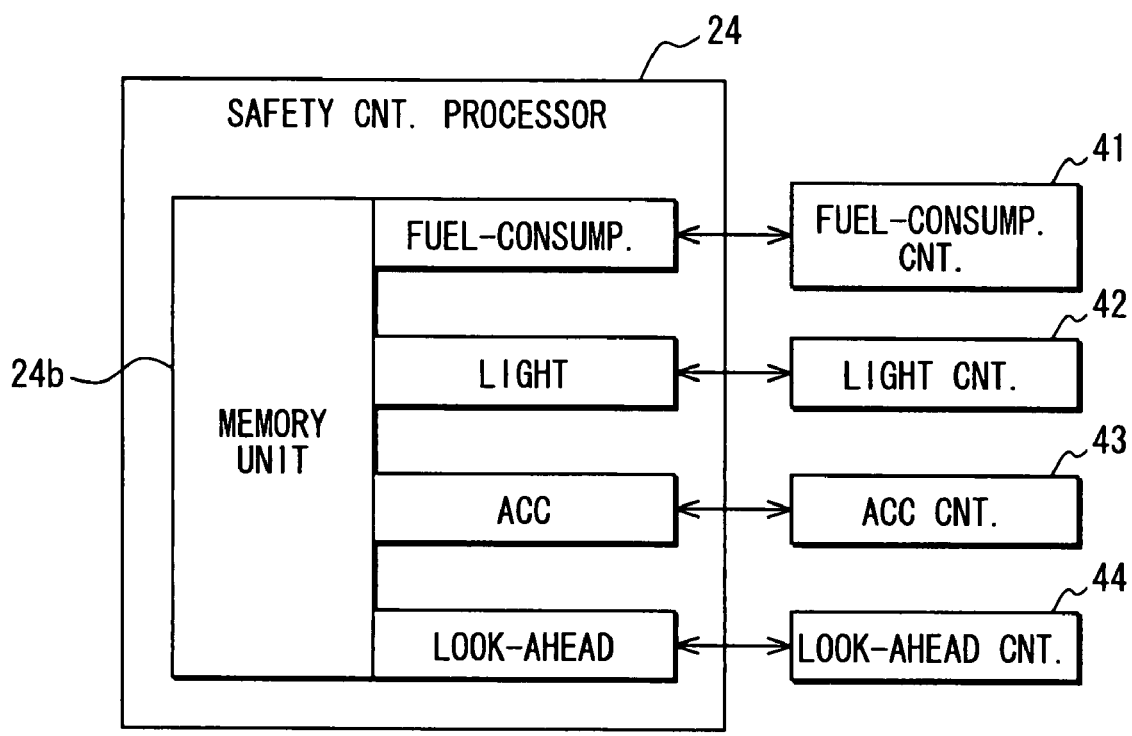
FIG. 14 shows a block diagram of a modification process of the control information.
Figure 15A:
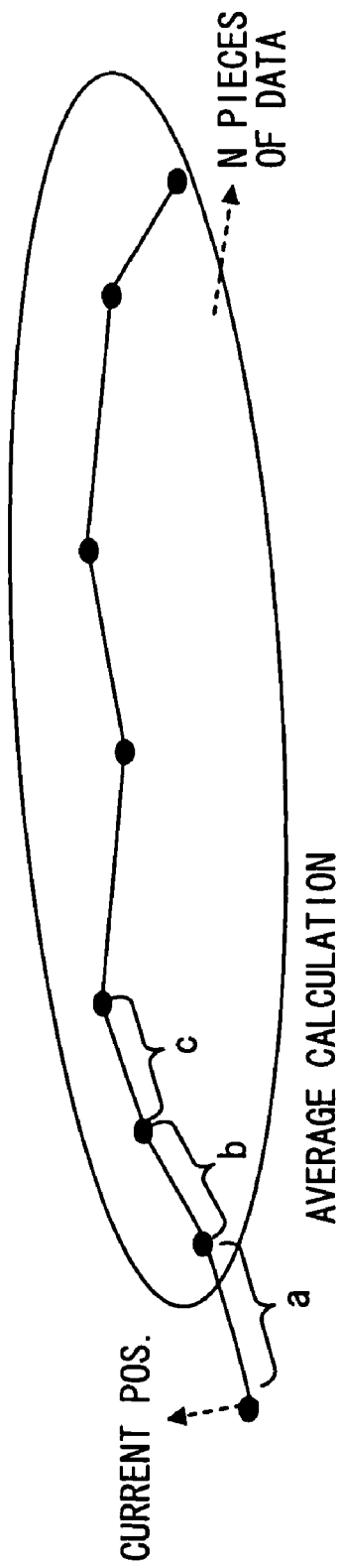
FIGS. 15A and 15B show illustrations of a calculation process of an averaged incline and a radius of a curved road.
Figure 15B:
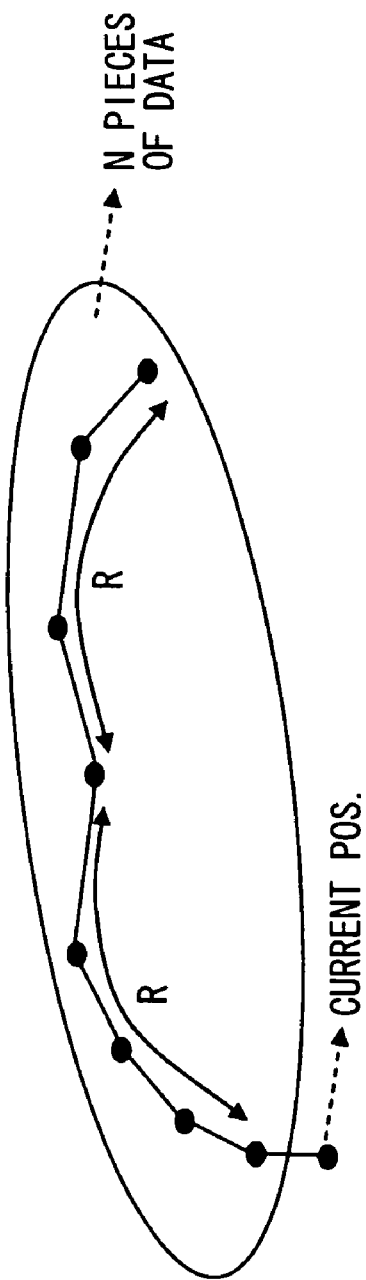

Then, when the process determines the control information is stored in step S401 (S401:YES), the process proceeds to step S402 for reading the control information from the memory unit 24a and outputting it to each of the vehicle control units 41-44. More practically, as shown in FIG. 14, the control information is output to each of the control units 41-44 after performing an information modification process that is suitable for each of the control units 41-44. That is, the vehicle control units 41-44 performs respectively different vehicle controls, thereby demanding respectively different kinds of information. For example, for the process in the fuel-consumption controller 41, an averaged incline of the road ahead of the vehicle and/or the radius of the curved road are required. Further, for example, for the process in the light controller 42, the radius of the curved road and/or a start point of the curve ahead of the vehicle are required. Therefore, tailored information for the vehicle control units 41-44 is generated based on the control information stored in the memory, and the tailored information is output to each of the control units 41-44. More practically, as shown in FIG. 15A, the averaged incline is calculated by averaging the inclines of a certain number (N pieces) of sections of the road starting from the current vehicle position. Further, the radius of the curved road is, as shown in FIG. 15B, N pieces of road shape data is retrieved for calculation.

Then, the process determines whether the start point pass flag is turned on in step S403. In this case, the start point pass flag is turned on in step S304 of the road information store process (FIG. 7) as described above.

When the start point pass flag is determined to be turned on in step S403 (S403:YES), the process proceeds to step S404 to output a start point pass notice to each of the vehicle control units 41-44. In this manner, each of the control units 41-44 recognizes the timing when the vehicle passes the control start point. In other words, each of the control units 41-44 recognizes the timing when the vehicle enters the road that corresponds to the absolute travel locus of the vehicle that is output as the control information.

Then, the process proceeds to step S405 to turn on a notice flag that indicates that the start point pass flag has been sent. Then, the process proceeds to step S406.

On the other hand, when the control information is not determined to be stored in step S401 (S401:NO), or when the start point pass flag is not determined to be turned on in step S403 (S403:NO), the process proceeds to step S406 without performing any process.

In step S406, the process determines whether the end point pass flag. In this case, the end point pass flag is turned on in step S310 in the road information store process (FIG. 7) as described above.

When the end point pass flag is determined to be turned on in step S406 (S406:YES), the process proceeds to step S407 and determines whether the notice flag is turned on. In this case, the notice flag is turned on when the start point pass notice is sent as described above, and is turned off when the end point pass notice is sent as described later in the description.

Then, when the notice flag is determined to be turned on in step S407 (S407:YES), the process proceeds to step S408 and outputs the end point pass notice to each of the vehicle control units 41-44. In this manner, each of the control units 41-44 recognizes the timing when the vehicle passes by the control end point. In other words, the timing when the vehicle exits from the road that corresponds to the absolute travel locus output as the control information.

Then, in step S409, the process turns off the notice flag. Then, the road information notification process is concluded.

On the other hand, when the end point pass flag is not determined to be turned on in step S406 (S406:NO), or when the notice flag is not determined to be turned on in step S407 (S407:NO), the road information notification process is concluded without performing any process.

A travel of the vehicle from the link L1 to the link L2 in FIG. 11 is now taken as an example of the actual process performed in the road information notification process described above.

Figure 16:
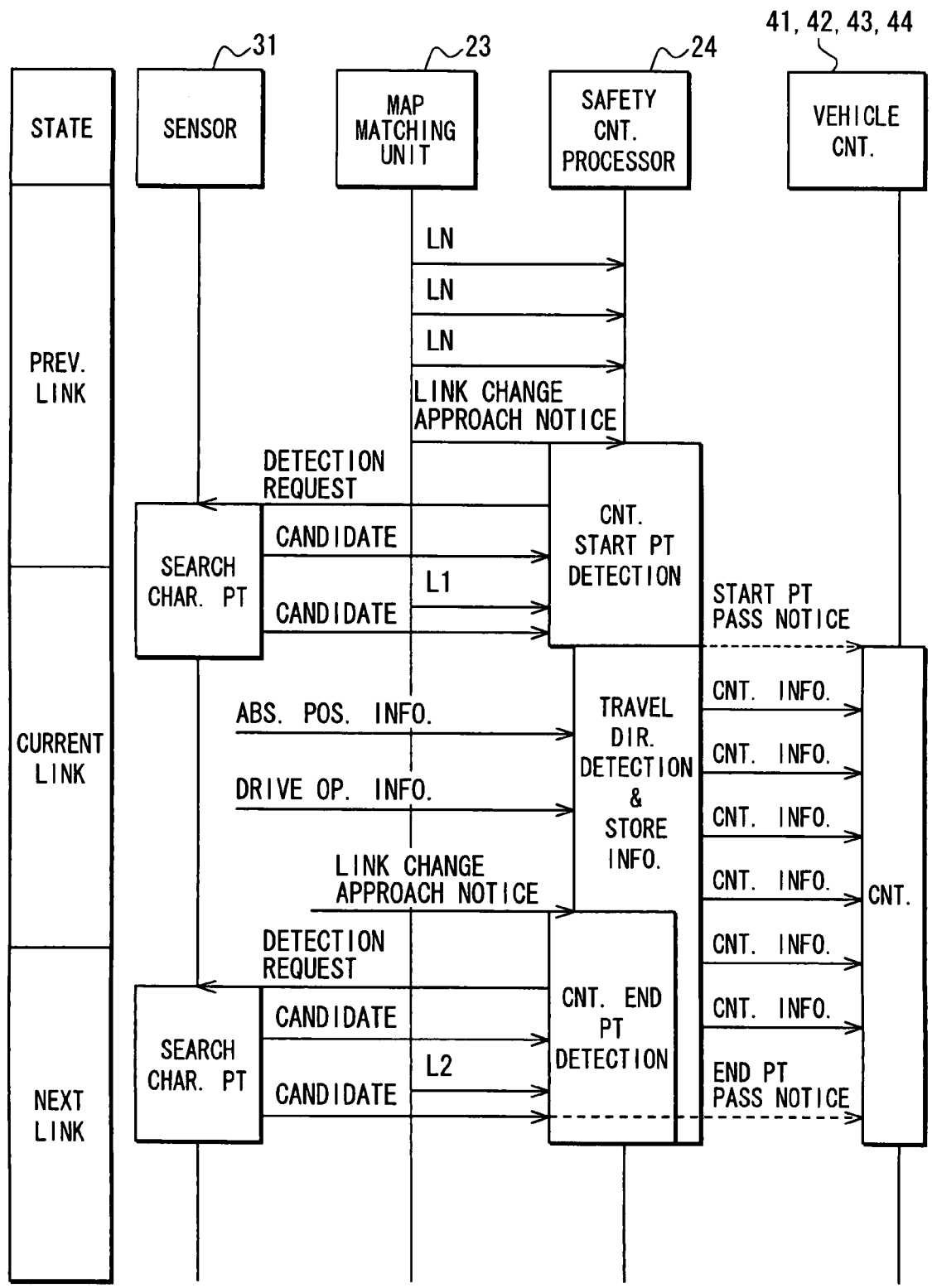
FIG. 16 shows a time chart of the road information notification process.

As shown in FIG. 16, while the vehicle is traveling the link LN that is prior to the link L1, the link ID of the link LN is output from the map matching unit 23 to the safety control processor 24. Then, when the vehicle reaches a proximity of the intersection (i.e., the start point of the link L1), the link change advance notice is output from the map matching unit 23 to the safety control processor 24.

The safety control processor 24 outputs the characteristic object detection request to the characteristic object detector 31 when the link change advance notice is inputted from the map matching unit 23. In this manner, the detector 31 starts the detection process of the characteristic object, and outputs the characteristic object candidate notice to the safety control processor 24 when the characteristic object such as the stop line or the pedestrian crossing is detected.

The safety control processor 24 determines, as the control start point of the link L1, the position of the featured point that corresponds to the characteristic object candidate notice (an intersection) inputted to the timing that is closest to the link change timing when the link ID is changed from the link LN to the link L1 based on the link ID from the map matching unit 23 and the characteristic object candidate notice from the detector 31. Then, the start point pass notice is output from the safety control processor 24 to each of the control units 41-44.

In addition, the safety control processor 24 outputs the control information of the link L1 to the vehicle control units 41-44. In this case, the control information may be output at once, or may be divided to be output at several occasions.

Then, the link change advance notice is output from the map matching unit 23 to the safety control processor 24 when the vehicle reaches a proximity of the intersection (i.e., the end point of the link L1).

The safety control processor 24 outputs the characteristic object detection request to the characteristic object detector 31 when the link change advance notice is inputted from the map matching unit 23. In this manner, the detector 31 starts the detection process of the characteristic object, and outputs the characteristic object detection notice the indicates the detection of the characteristic object when the characteristic object is detected.

The safety control processor 24 determines, as the control end point of the link L1, the position of the featured point that corresponds to the characteristic object candidate notice (a stop line) inputted at the timing that is closest to the link change timing of the link ID from the link L1 to the link L2 based on the link ID from the map matching unit 23 and the characteristic object candidate notice from the characteristic object detector 31. Then, the end point pass notice is output from the safety control processor 24 to each of the control units 41-44.

The control information as well as the start point pass notice, and the end point pass notice of the link L1 are output in the manner described above.

[Concrete Examples of the Processes]

Figure 17:
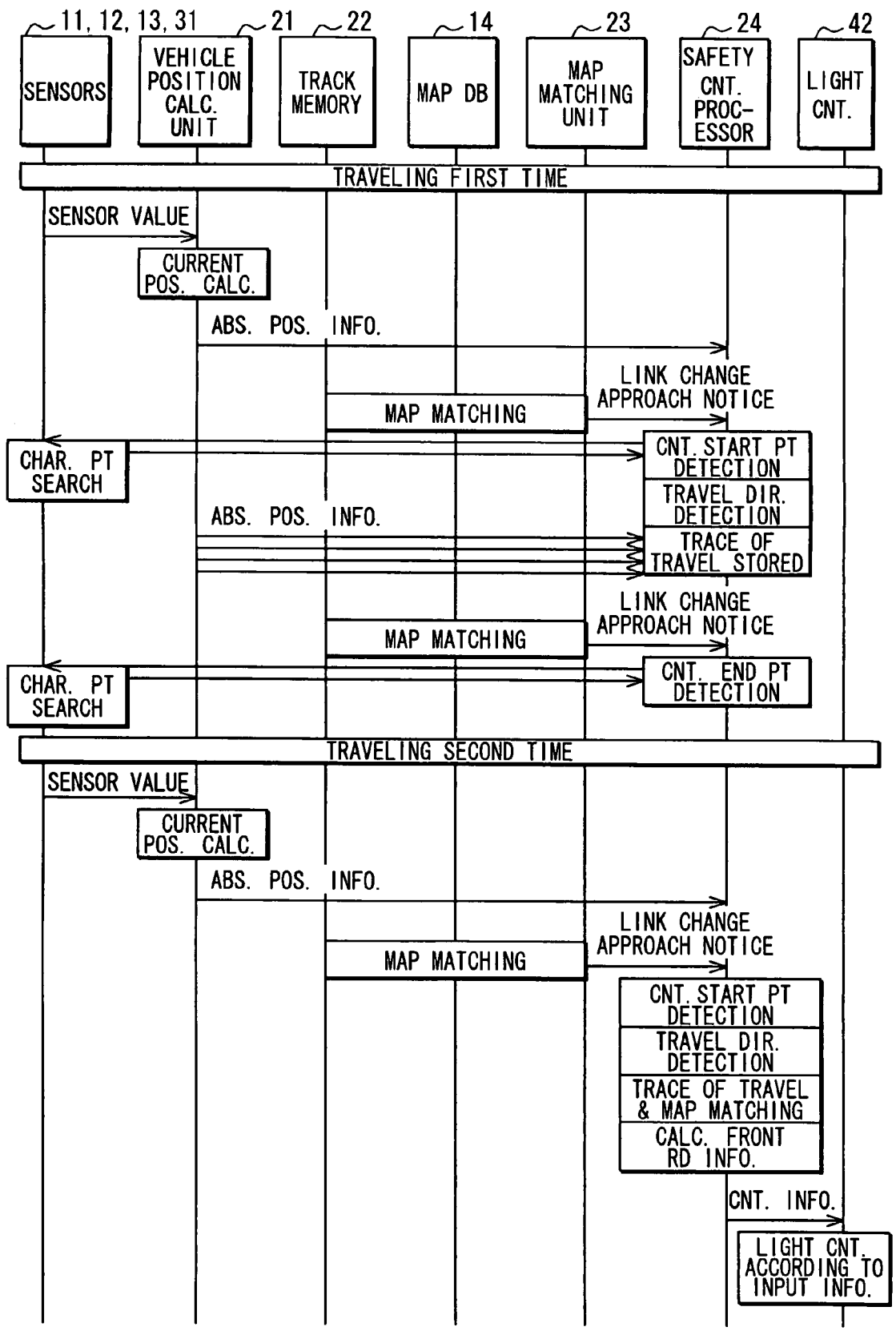
FIG. 17 shows a time chart of a process that is performed in the navigation system.

Next, the process performed by the navigation apparatus 10 in the present disclosure is described with reference to the time chart in FIG. 17. The process is exemplarily explained for a case where the control information is output to the light controller 42.

The case is divided into two situations. That is, when the vehicle travels the road for the first time, and when the vehicle travels the same road afterwards.

First, the first time travel of the vehicle on the certain road is described.

While traveling, the vehicle position calculation unit 21 periodically outputs the absolute position information to the safety control processor 24 based on the detection values from the GPS sensor 11, the direction sensor 12 and the distance sensor 13.

The map matching unit 23 performs a map matching process based on the travel locus data stored in the track memory 22 and the map data stored in the map database 14. Then, the map matching unit 23 outputs the link change advance notice to the safety control processor 24 when the vehicle reaches a proximity of the intersection.

The safety control processor 24 outputs the characteristic object detection request to the characteristic object detector 31 when the link change advance notice is inputted from the map matching unit 23. In this manner, the characteristic object detector 31 starts the detection process of the characteristic object, and outputs the characteristic object candidate notice to the safety control processor 24 when the characteristic object (a stop line or a pedestrian crossing) is detected.

The safety control processor 24 determines the control start point based on the characteristic object candidate notice and the link ID. Then, the safety control processor 24 stores the absolute position information from the vehicle position calculation unit 21 and the drive operation information from the drive operation detector 32 while determining the travel direction of the vehicle. Then, the safety control processor 24 outputs the characteristic object detection request to the characteristic object detector 31 when the link change advance notice is inputted again from the map matching unit 23. In this manner, the characteristic object detector 31 starts the detection process of the characteristic object, and outputs the characteristic object candidate notice for notifying the detection of the characteristic object such as a stop line or a pedestrian crossing to the safety control processor 24 when the characteristic object is detected.

The safety control processor 24 determines the control end point based on the characteristic object candidate notice and the link ID. Then, the absolute travel locus and the drive operation information between the control start point and the control end point determined in the above-described manner are stored as the control information.

Next, the second time travel of the vehicle on the certain road is described.

While traveling, the vehicle position calculation unit 21 periodically outputs the absolute position information to the safety control processor 24 based on the detection values from the GPS sensor 11, the direction sensor 12 and the distance sensor 13.

The map matching unit 23 performs a map matching process based on the travel locus data stored in the track memory 22 and the map data stored in the map database 14. Then, the map matching unit 23 outputs the link change advance notice to the safety control processor 24 when the vehicle reaches a proximity of the intersection.

The safety control processor 24 determines the control start point and the travel direction of the vehicle as described above, and stores the absolute position calculation unit 21 from the vehicle position calculation unit and the drive operation information from the drive operation detector 32.

Further, the safety control processor 24 (i.e., the processor unit 24b) performs the modification process for the already stored control information. More practically, the radius of the curved road calculation process described above or the like is calculated for generating the road information of the road ahead of the vehicle. Then, the control information after the modification process is output to the light controller 42. Further, the safety control processor 24 notifies the timing when the vehicle passes the control start point and the control end point.

The light controller 42 performs the vehicle control according to the control information as well as a pass timing that is defined by passage of the vehicle by the control start point and the control end point.

In this manner, when the vehicle travels a certain road for the second time or later, a store process of the control information as well as an output process of the already stored control information to the light controller 42 are performed. In this case, the timing of the vehicle control is accurately synchronized because the control start point and the control end point are detected by using the same detection condition for every detection occasion.

[Effect of the Present Disclosure]

The navigation apparatus 10 in the present invention detects the point where the vehicle exits from an intersection as the control start point of the vehicle control (S303) and the point where the vehicle enters into the next intersection as the control end point of the vehicle control (S308). Further, the control start point defined as a start point of the travel locus and the control end point defined as an end point of the travel locus specify the absolute travel locus of the vehicle to be utilized as the control information that is stored for respective travel directions (S311). Furthermore, the control information is output to each of the vehicle control units 41-44 when the vehicle travels the road that does not have the stored control information (S402), and the vehicle passage timing at the control start point and the control end point are notified (S404, S408).

Therefore, the vehicle control that agrees with the shape of the actual road is enabled in the vehicle control units 41-44 based on the absolute travel locus of the vehicle, as well as a highly accurate vehicle control start timing based on the control start point and the control end point.

Particularly, the apparatus 10 outputs the control information to the control units 41-44 after modification for respective units 41-44, thereby improving the efficiency of the information output to the respective units 41-44 due to the reduction of the output information only to the required portion.

Further, the apparatus 10 detects of the vehicle passage point where the characteristic object closest to the link change point that defines a connection point of two links corresponding to the currently traveled road is located among the plural characteristic objects detected by the characteristic object detector 31. In this manner, the pedestrian crossing of an intersection can be accurately detected even when another pedestrian crossing exists at a proximity of the pedestrian crossing of the intersection.

Furthermore, when the vehicle has a back camera on its rear end for capturing a look-down image from a high position as the characteristic object detector 31, the vehicle passage timing at the pedestrian crossing or the stop line can be accurately detected.

In addition, because the characteristic object detector 31 starts the detection process of the characteristic object when the vehicle comes close to the intersection that exists ahead of the vehicle, the detection process is effectively performed as well as achieving a reduction of erroneous detection.

The navigation apparatus 10 in the present embodiment stores the drive operation information detected by the drive operation detector 32 as the control information, thereby enabling the vehicle control that accords with the drive operation by the driver of the vehicle in the vehicle control units 41-44.

[Other Embodiments]

Although the present invention has been fully described in connection with the preferred embodiment thereof with reference to the accompanying drawings, it is to be noted that various changes and modifications will become apparent to those skilled in the art.

For example, (1) The back camera 31 used in the above embodiment may be replaced with other devices. That is, for example, a front camera that images a front view of the vehicle may be used for detecting a characteristic object in an intersection. In this case, the vehicle passage timing at a road sign may be calculated based on a distance to the road sign and the vehicle speed. Further, when the front camera is capable of capturing an image that is right under the vehicle, the vehicle passage timing may be calculated in the same manner as the back camera.

In addition, the characteristic object detector 31 may be implemented as, for example, a radar device such as a laser radar, a millimetric-wave radar or the like as long as the device is capable of detecting a position of the characteristic object. Further, the radar device may be used in combination with the camera for detecting the characteristic object. That is, while the camera may capture a look down image, the radar device may capture a front image.

(2) The characteristic object detected in the above embodiment such as the stop line or the pedestrian crossing may be substituted with other objects.

Figure 18A:
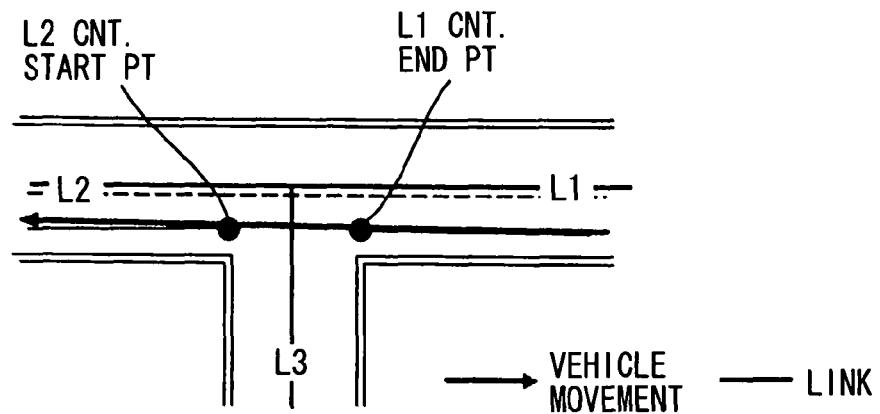
FIGS. 18A and 18B show illustrations of a process for detecting a featured point in the intersection.

That is, for example, a road marker such as while lines on both sides of the road may be used for detecting the control point. More practically, as shown in FIG. 18A, a disconnected end of the while line on the left side of the road may be detected as the entrance position of the vehicle into the intersection (i.e., the control end point) when the vehicle travels from the link L1 to the link L2, and a reappearing end of the while line on the left side of the road may be detected as the exit position of the vehicle from the intersection (i.e., the control start point). In this manner, the control start and end points may be detected for an intersection that does not have the stop line or the pedestrian crossing.

In addition, the characteristic object is not restricted to the road marker or the like. That is, a facility disposed on or around the road (e.g., a traffic signal, a road side device or the like) may be used as the characteristic object as long as the object can be used to indicate a position of an intersection.

When, for example, a traffic signal post for the pedestrian is used as the position of the control start/end point, the traffic signal portion (i.e., a light bulb) may preferably be detected in association with the post itself for avoiding a false detection of the post of other devices.

Further, the control start/end points may be detected based on an input from the road side devices at an intersection that transmits a radio signal.

(3) The characteristic object detected in the above embodiment may not necessarily be limited to only one kind. That is, in the above embodiment, the control start point is associated with the pedestrian crossing, and the control end point is associated with the stop line. However, the control start/end point may be associated with plural kinds of characteristic object.

Further, the type of the intersection ahead of the vehicle may be determined based on the map data, and the characteristic object detector 31 may detect the characteristic object that accords with the type of the intersection. That is, for example, the type of the intersection may be determined as a cross shape, a T shape, a junction type, a merge type or the like, and the detector 31 may detect the pedestrian crossing as the characteristic object when the type of the intersection is determined as the cross shape type. The characteristic object to be detected may be changed to the white line when the type of the intersection is determined as the T shape. In this manner, the characteristic object that is highly probable to be existing in the intersection can selectively be chosen as a target of detection, thereby enabling an improvement of the detection rate of the characteristic object.

(4) The control start/end point in the above embodiment is determined as the closest point to the link change point of the currently traveled road among the points of the characteristic objects detected by the detector 31. However, the control start/end point may be determined differently.

That is, for example, the control start point may be detected as the characteristic object (a pedestrian crossing) through which the vehicle has passed immediately after the link change of the currently traveled road, and the control end point may be detected as the characteristic object (a stop line) through which the vehicle has passed immediately before the link change of the currently traveled road.

Further, the point of the characteristic object detected by the detector 31 may be determined as the control start/end point regardless of the timing of the link change of the currently traveled road.

Figure 19:
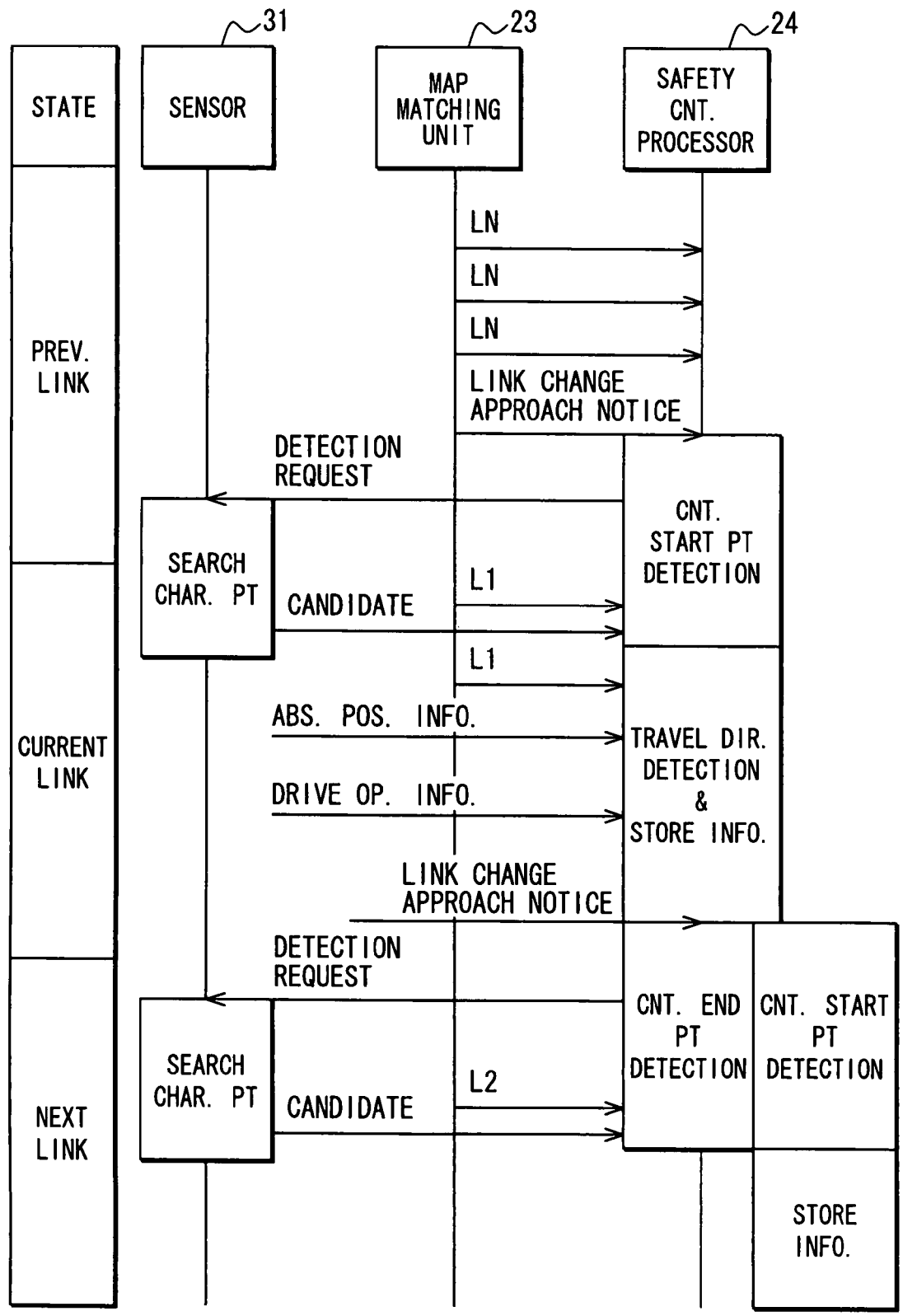
FIG. 19 shows a time chart of a process that prioritizes a detection result of a featured object detection sensor.

More practically, the process illustrated in FIG. 12 may be replaced with the process in FIG. 19. That is, in FIG. 19, the safety control processor 24 determines the position of the characteristic object in the characteristic object candidate notice based on the input of the characteristic object candidate notice (an intersection) from the detector 31 regardless of the link change timing that is defined as the timing of link ID transition from the link LN to the link L1 inputted from the map matching unit 23. In other words, the position of the characteristic object in the characteristic object candidate notice is determined as the control start point of the link L1.

Furthermore, in the same manner as described above, the safety control processor 24 may determine the position of the characteristic object as the control end point of the link L1 based on the characteristic object candidate notice (a stop line), regardless of the link change timing when the link ID inputted from the map matching unit 23 is changed from the link L1 to the link L2.

Therefore, a relatively lower map matching accuracy that leads to fluctuated link change timings may be compensated and improved in terms of detection of the control start/end point by prioritizing the detection result of the detector 31 when the detection operation by the detector 31 is highly accurate.

(5) The control start/end point is detected based on the characteristic object detected by the detector 31 in the above embodiment. However, the control start/end point may be detected without using the detector 31.

That is, for example, the position of the link change of the currently traveled road may be detected as the control start/end point.

Further, the steering angle in a certain predetermined range may be used for detecting the position of the control start/end point. More practically, a turning operation in an intersection may be detected based on the steering angle, and the position of the turning operation may be detected as the control end point. Further, a reverse operation of the steering wheel after the turning operation may be detected as the control start point. In addition, the detection of the lack of the steering operation in an intersection may be considered as the position of the control end and start point when the vehicle passes the intersection. Therefore, the control start/end point may be detected based on the change of the steering angle.

Figure 18B:
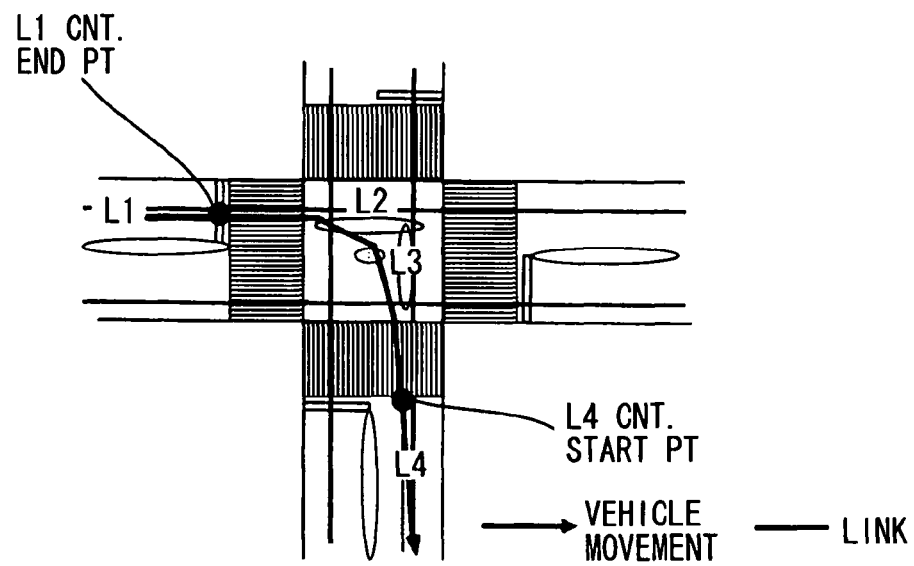

(6) In the above embodiment, the road network represented by the map data assumes that the node is positioned at the center of each intersection of the actual road and the links are defined as a connection between those nodes (as shown in FIG. 2). However, plural nodes can be set to single intersection as the map data. That is, as shown in FIG. 18B, there may be a case that two links are assigned to both sides of the road that is split by a median. In this case, there are four nodes at the cross shape intersection, and the connection between those nodes are defined as the links. Therefore, when the vehicle travels from the link L1 to the link L4, the vehicle goes through three link changes as it transits the links from L1 to L2 to L3 to L4. Thus, the plural link changes in one intersection may preferably be represented by one link change, possibly the first one, for example. More practically, the when an interval between two link changes or a distance between two link changes is equal to or smaller than a predetermined value, the intersection is determined to have plural link changes. In this manner, the intersection with plural nodes can have one representative link change point. As a result, the control start point and the control end point can correctly be detected.

(7) In the above embodiment, the drive operation information for the entire absolute travel locus is stored as the control information. However, the drive operation information for only a limited portion of the road may be stored. In addition, the drive operation information may totally be omitted from the control information.

(8) In the above embodiment, the control information is associated with the links (i.e., a unit of the road from one intersection to the next intersection). However, the method of the association is not limited to the above manner, and the control information may be associated with a unit of plural links. For example, when a highway having multiple lanes or the like crosses a number of smaller roads having only one lane, the control information may better be utilized as divided in accordance to the unit of the plural links that are defined by the intersections of highways rather than the unit of the single link. Therefore, the road such as the highways or the like may have the unit of plural links for better accommodating the storage of the control information.

(9) In the above embodiment, the control information is output to each of the vehicle control units 41-44 after performing modification for the respective control units 41-44. However, the control information may be output without performing the modification.

(10) In the above embodiment, the absolute travel locus uses the control start point as its start point and the control end point as its end point. However, the start point may be associated to the point that is positioned prior to the control start point and the end point may be associated to the point that is positioned behind the control end point, and the absolute travel locus may be stored by using those points. The control start point and the control end point may be stored separately from those points.

(11) The control information storage apparatus in the above embodiment is described as the navigation apparatus 10. However, the control information storage apparatus may be implemented as a different apparatus from the navigation apparatus.

Such changes and modifications are to be understood as being within the scope of the present invention as defined by the appended claims.

What is claimed is:

1. A control information storage apparatus comprising:
   a position detector that detects a current position of a vehicle;
   an information storage that stores a travel locus of the vehicle based on the current position of the vehicle as control information to be utilized for controlling the vehicle at an exit from an intersection;
   a control point detection unit that detects an exit point from the intersection as a control start point for starting a control of the vehicle;
   an object detection unit that detects a featured object on a road;
   a map acquisition unit that acquires map data for representing a road by using a node that is positioned in an intersection and a link that connects the nodes, wherein
   the information storage stores the control start point detected by the control point detection unit as the control information,
   the control point detection unit detects a detection point where the vehicle passes by an object that is closest to a point where a link that corresponds to a road traveled by the vehicle is changed from among plural locations of featured objects detected by the object detection unit, and the control point detection unit detects the detection point as the control start point.

2. The control information storage apparatus of claim 1, wherein the information storage stores the travel locus that starts at the control start point detected by the control point detection unit.

3. The control information storage apparatus of claim 1 further comprising: an information output unit that outputs to an external device the control information stored by the information storage.

4. The control information storage apparatus of claim 3, wherein the information output unit outputs the control information to a vehicle control unit for controlling the vehicle.

5. The control information storage apparatus of claim 4 further comprising: a timing notification unit that notifies a vehicle pass-through timing marked by a time when the vehicle passes the control start point as a timing when the vehicle enters into a road that is associated with the travel locus stored in the information storage.

6. The control information storage apparatus of claim 5, wherein the information output unit outputs the control information to the vehicle control unit after performing a modification process.

7. The control information storage apparatus of claim 6, wherein the information output unit outputs the control information after performing the modification process for each of the vehicle control unit.

8. The control information storage apparatus of claim 1, wherein the control point detection unit detects a point where a steering wheel of the vehicle fulfills a predetermined condition as the control start point.

9. The control information storage apparatus of claim 1 further comprising: a map acquisition unit that acquires map data for representing a road by using a node that is positioned in an intersection and a link that connects the nodes, wherein the control point detection unit detects a point where a link that corresponds to a road traveled by the vehicle is changed as the control start point.

10. The control information storage apparatus of claim 9, wherein the map data include a road that specifies plural nodes for single intersection, and the control point detection unit regards only one of plural changes of the link as a link change point when the plural changes of the link are detected in the single intersection.

11. The control information storage apparatus of claim 10, wherein the control point detection unit detects the plural changes of the link in the single intersection when one of the plural changes of the link is succeeded by another link change in an interval that is equal to or smaller than one of a predetermined time and a predetermined distance.

12. The control information storage apparatus of claim 1, wherein the control point detection unit detects a point where the vehicle passes the featured object detected by the object detection unit as the control start point.

13. The control information storage apparatus of claim 1, wherein the object detection unit detects an indicative object that indicates a position of an intersection as the featured object.

14. The control information storage apparatus of claim 1, wherein the object detection unit starts a detection operation for detecting the featured object when the vehicle reaches a proximity of an intersection that exists ahead of the vehicle.

15. The control information storage apparatus of claim 14, wherein the object detection unit detects the featured object that accords with a kind of the intersection ahead of the vehicle.

16. The control information storage apparatus of claim 1, wherein the information storage stores the control information respectively for plural travel directions of a road.

17. The control information storage apparatus of claim 1, wherein the information storage stores a driving operation of a driver of the vehicle as the control information.

18. The control information storage apparatus of claim 1, wherein the control point detection unit detects a point where the vehicle enters into the intersection as a control end point for ending the control of the vehicle, and the information storage stores the control end point detected by the control point detection unit as the control information.

19. The control information storage apparatus of claim 1, wherein the information storage stores a travel locus that ends at the control end point detected by the control point detection unit.

20. The control information storage apparatus of claim 1, wherein the position detector, the information storage, and the control point detection unit are formed by a computer.

* * * * *